US011646561B1

(12) United States Patent
Thorpe et al.

(10) Patent No.: US 11,646,561 B1
(45) Date of Patent: May 9, 2023

(54) UTILITY POLE MOUNTED LIGHTNING ROD

(71) Applicants: Richard Thorpe, Clovis, NM (US); Angelina Thorpe, Clovis, NM (US)

(72) Inventors: Richard Thorpe, Clovis, NM (US); Angelina Thorpe, Clovis, NM (US)

( * ) Notice: Subject to any disclaimer, the term of this patent is extended or adjusted under 35 U.S.C. 154(b) by 2 days.

(21) Appl. No.: 17/550,065

(22) Filed: Dec. 14, 2021

(51) Int. Cl.
*H02G 13/00* (2006.01)
*H02G 7/00* (2006.01)

(52) U.S. Cl.
CPC ............. *H02G 13/80* (2013.01); *H02G 13/40* (2013.01); *H02G 7/00* (2013.01)

(58) Field of Classification Search
CPC ........... H02G 13/80; H02G 13/40; H02G 7/00
See application file for complete search history.

(56) References Cited

U.S. PATENT DOCUMENTS

| 3,335,213 | A | 8/1967 | Cairone |
| 3,369,788 | A | 2/1968 | Eisele |
| 3,671,002 | A | 6/1972 | Elliott |
| D252,616 | S | 8/1979 | Hosokawa |
| 5,632,461 | A | 5/1997 | von Helms |
| 6,142,434 | A | 11/2000 | Trost |
| 8,050,007 | B1 * | 11/2011 | DeGurski .............. H02G 13/00 361/216 |
| 9,930,668 | B2 * | 3/2018 | Barzegar ............ H04B 7/15542 |
| 2007/0115607 | A1 * | 5/2007 | Rizk ....................... H02G 13/00 361/220 |
| 2008/0310071 | A1 | 12/2008 | Jeon |

FOREIGN PATENT DOCUMENTS

WO    1990014481    11/1990

* cited by examiner

*Primary Examiner* — Pete T Lee
(74) *Attorney, Agent, or Firm* — Kyle A. Fletcher, Esq.

(57) ABSTRACT

The utility pole mounted lightning rod may comprise a base plate, a housing tube, and a lightning rod. The utility pole mounted lightning rod may be a lightning protection system that is adapted to be mounted at the top of a utility pole. The utility pole mounted lightning rod may divert energy from a lightning strike to a grounding wire and away from primary wires and other power utility equipment. The base plate may be coupled to a side of the utility pole at the top of the utility pole. The housing tube may be coupled to the base plate at an oblique angle and may retain the lightning rod. The utility pole mounted lightning rod may be operable on three-phase posts where contact with one of the primary wires passing directly over the top of the utility pole must be avoided.

19 Claims, 7 Drawing Sheets

UTILITY POLE MOUNTED LIGHTNING ROD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lightning protection systems, more specifically, a utility pole mounted lightning rod.

SUMMARY OF INVENTION

The utility pole mounted lightning rod may comprise a base plate, a housing tube, and a lightning rod. The utility pole mounted lightning rod may be a lightning protection system that is adapted to be mounted at the top of a utility pole. The utility pole mounted lightning rod may divert energy from a lightning strike to a grounding wire and away from primary wires and other power utility equipment. The base plate may be coupled to a side of the utility pole at the top of the utility pole. The housing tube may be coupled to the base plate at an oblique angle and may retain the lightning rod. The utility pole mounted lightning rod may be operable on three-phase posts where contact with one of the primary wires passing directly over the top of the utility pole must be avoided.

An object of the invention is to position a lightning rod at the top of a utility pole and to electrically couple the lightning rod to a grounding wire.

Another object of the invention is to retain the lightning rod at an oblique angle such that the lighting rod may avoid contact with a primary wire running over the top of the utility pole.

A further object of the invention is to mount the lightning rod at the top of the utility pole using a base plate that couples to the utility pole using two mounting bolts.

Yet another object of the invention is to hold the lightning rod in a housing using a retention bolt that may be loosened to remove the lighting rod and tightened to retain the lightning rod.

These together with additional objects, features and advantages of the utility pole mounted lightning rod will be readily apparent to those of ordinary skill in the art upon reading the following detailed description of the presently preferred, but nonetheless illustrative, embodiments when taken in conjunction with the accompanying drawings.

In this respect, before explaining the current embodiments of the utility pole mounted lightning rod in detail, it is to be understood that the utility pole mounted lightning rod is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the utility pole mounted lightning rod.

It is therefore important that the claims be regarded as including such equivalent construction insofar as they do not depart from the spirit and scope of the utility pole mounted lightning rod. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
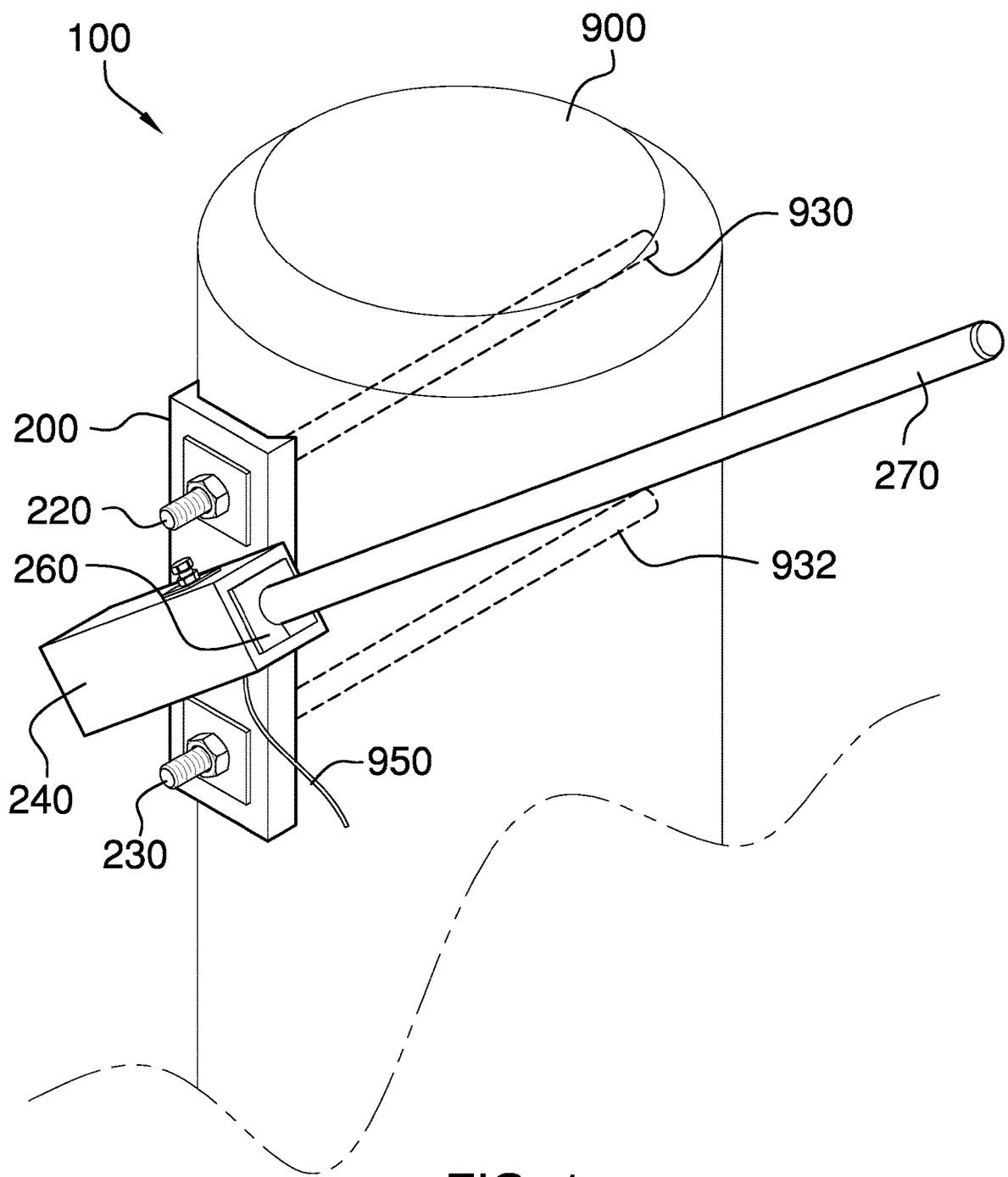
FIG. 1 is an isometric in-use view of an embodiment of the disclosure.
Figure 2:
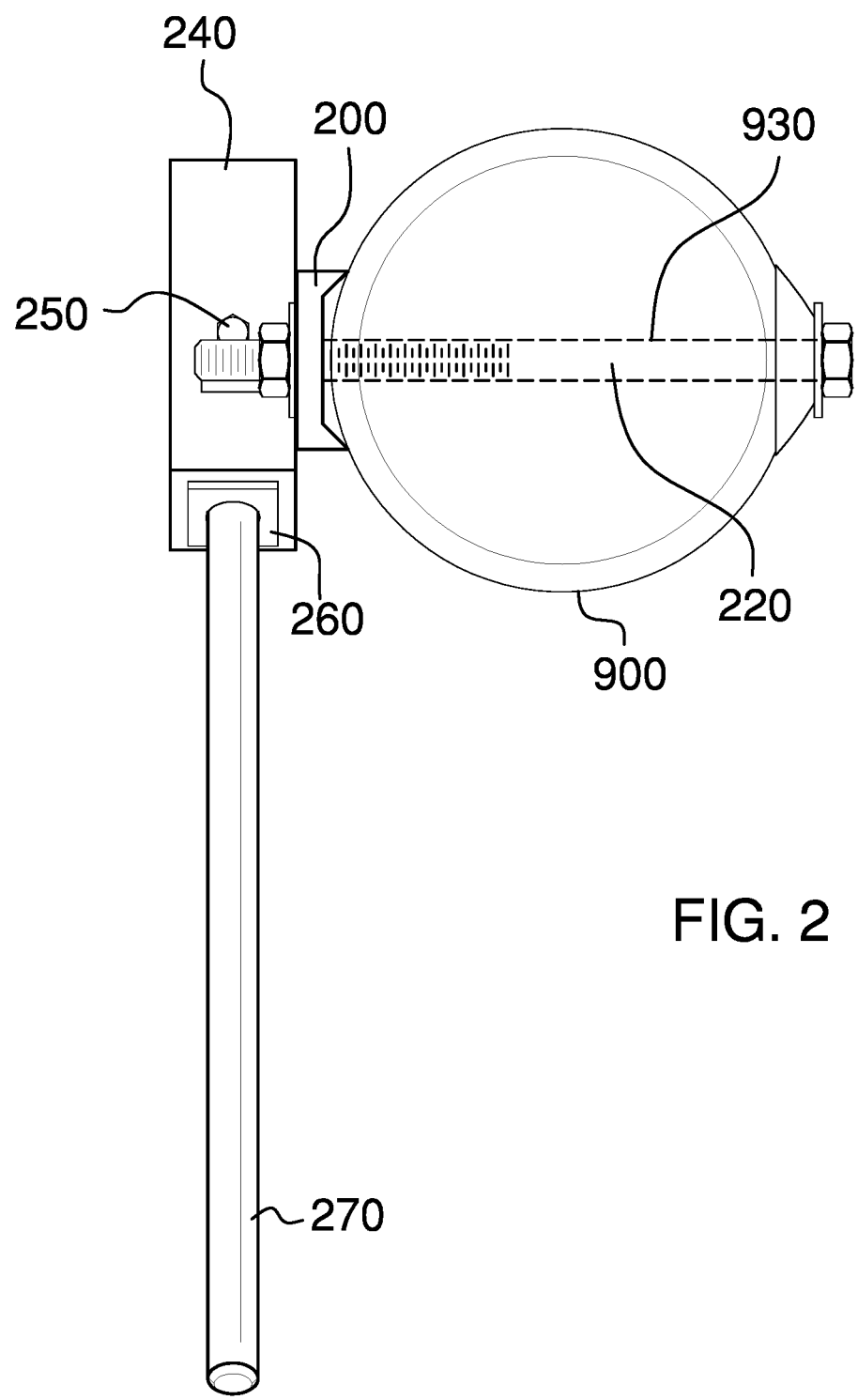
FIG. 2 is a top in-use view of an embodiment of the disclosure.
Figure 3:
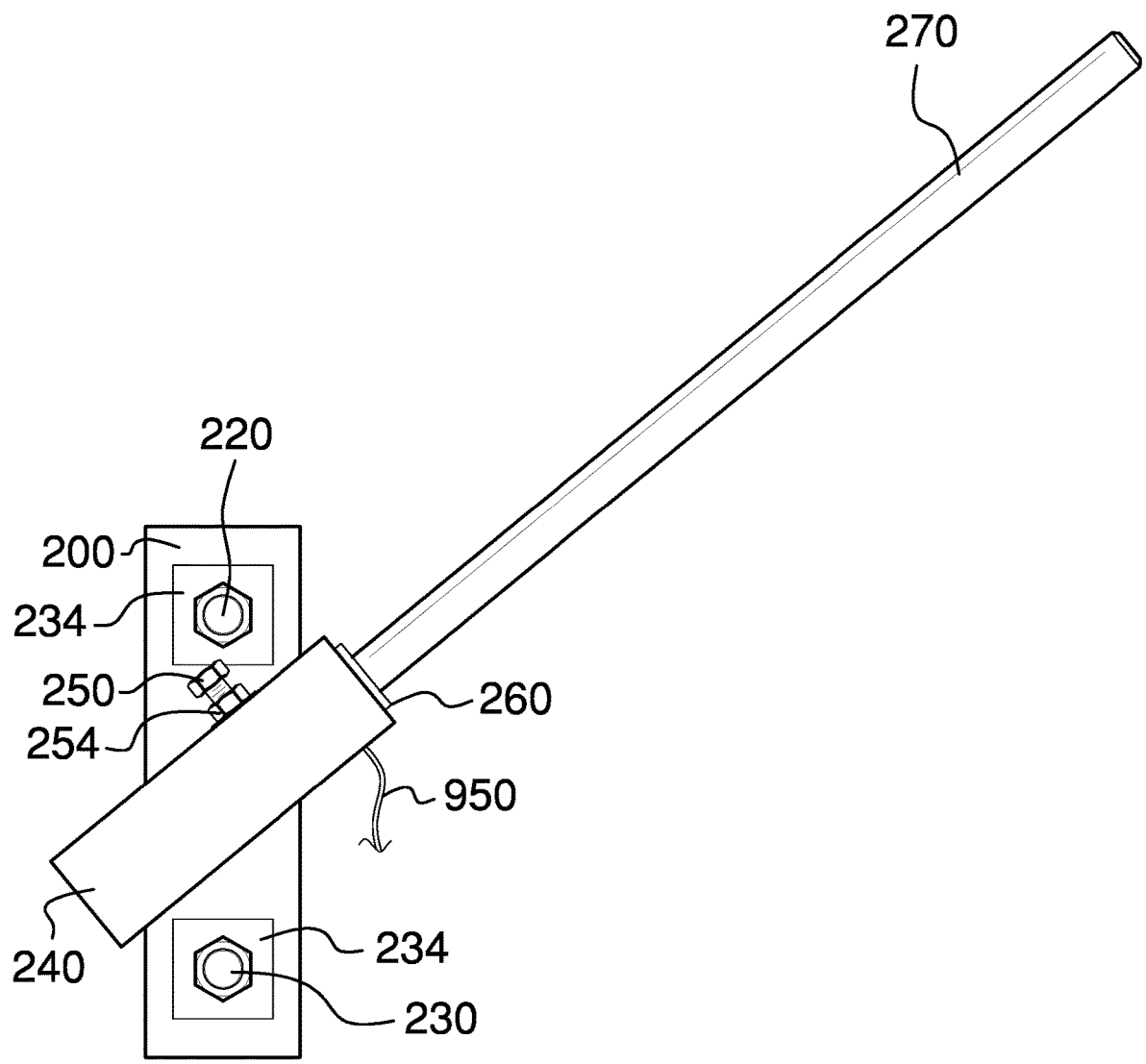
FIG. 3 is a front view of an embodiment of the disclosure.
Figure 4:
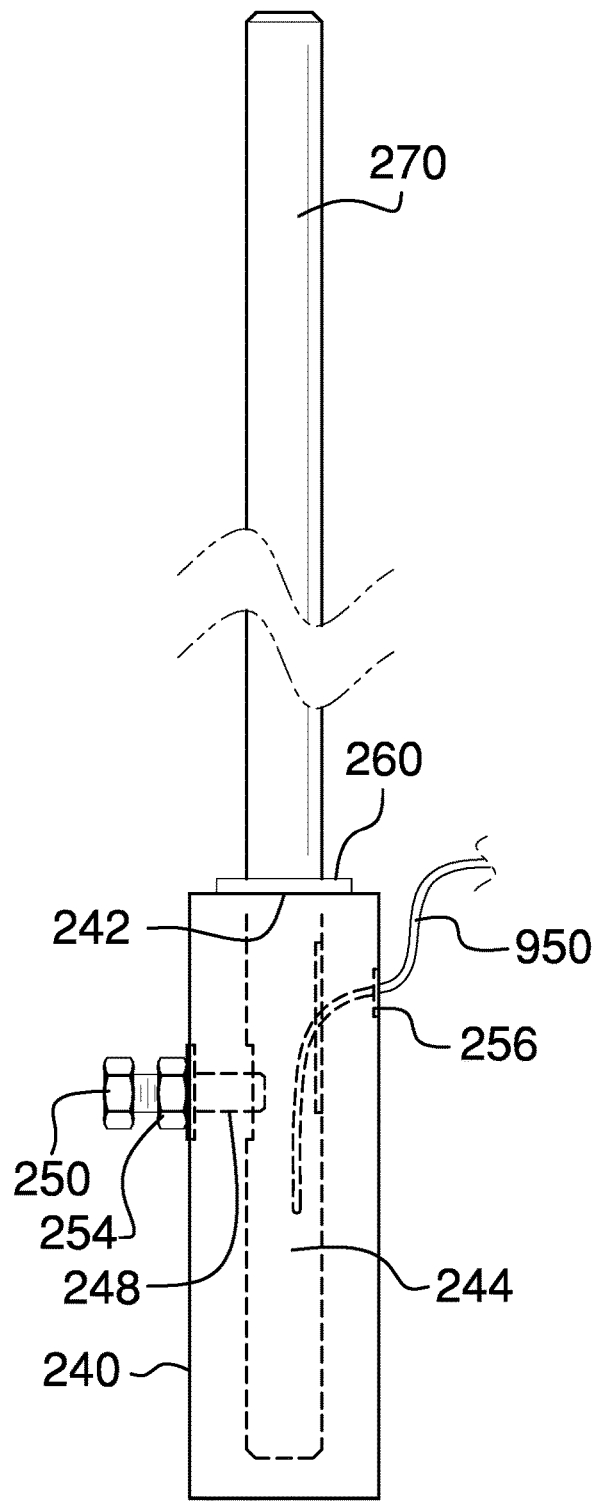
FIG. 4 is a side detail view of an embodiment of the disclosure illustrating the housing and the lightning rod.
Figure 5:
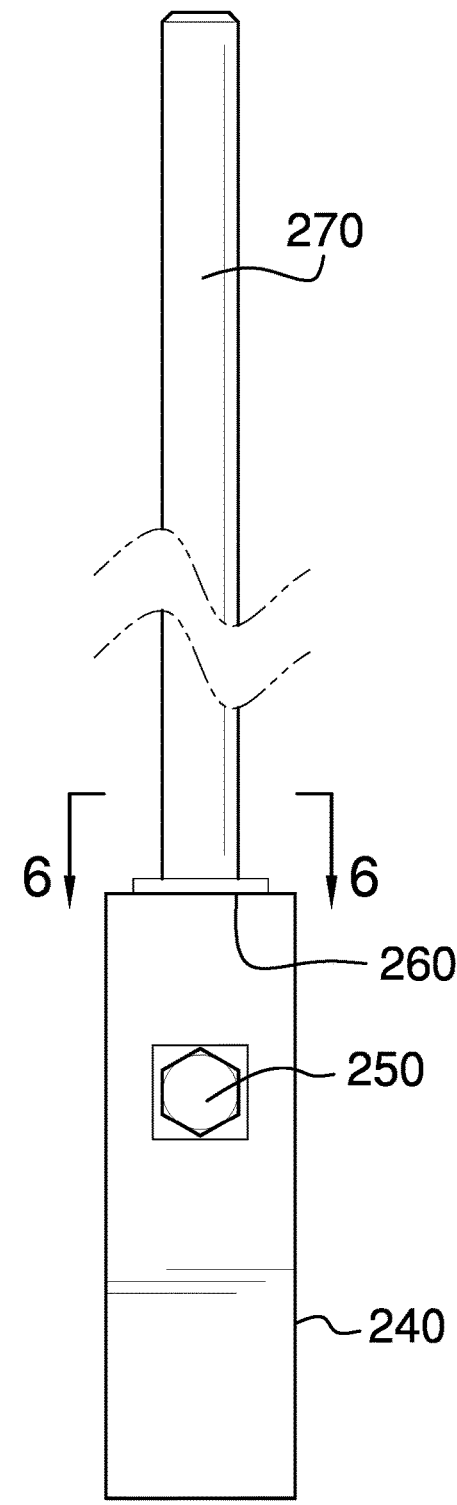
FIG. 5 is a front detail view of an embodiment of the disclosure.
Figure 6:
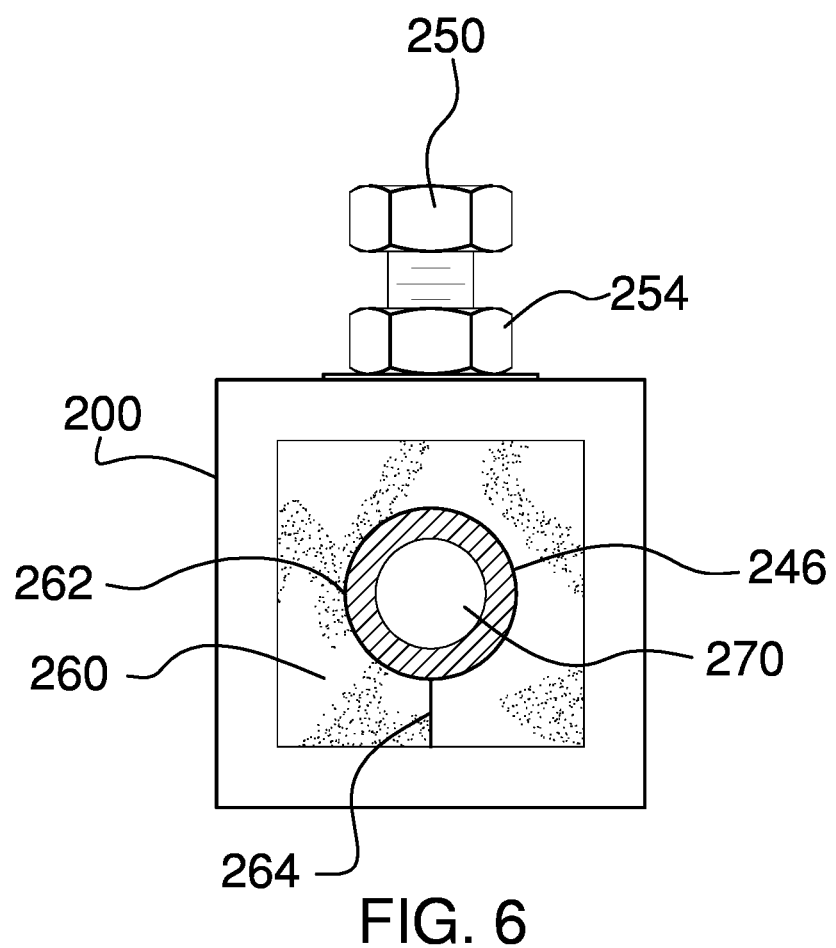
FIG. 6 is a cross-sectional view of an embodiment of the disclosure across 6-6 as shown in FIG. 5.
Figure 7:
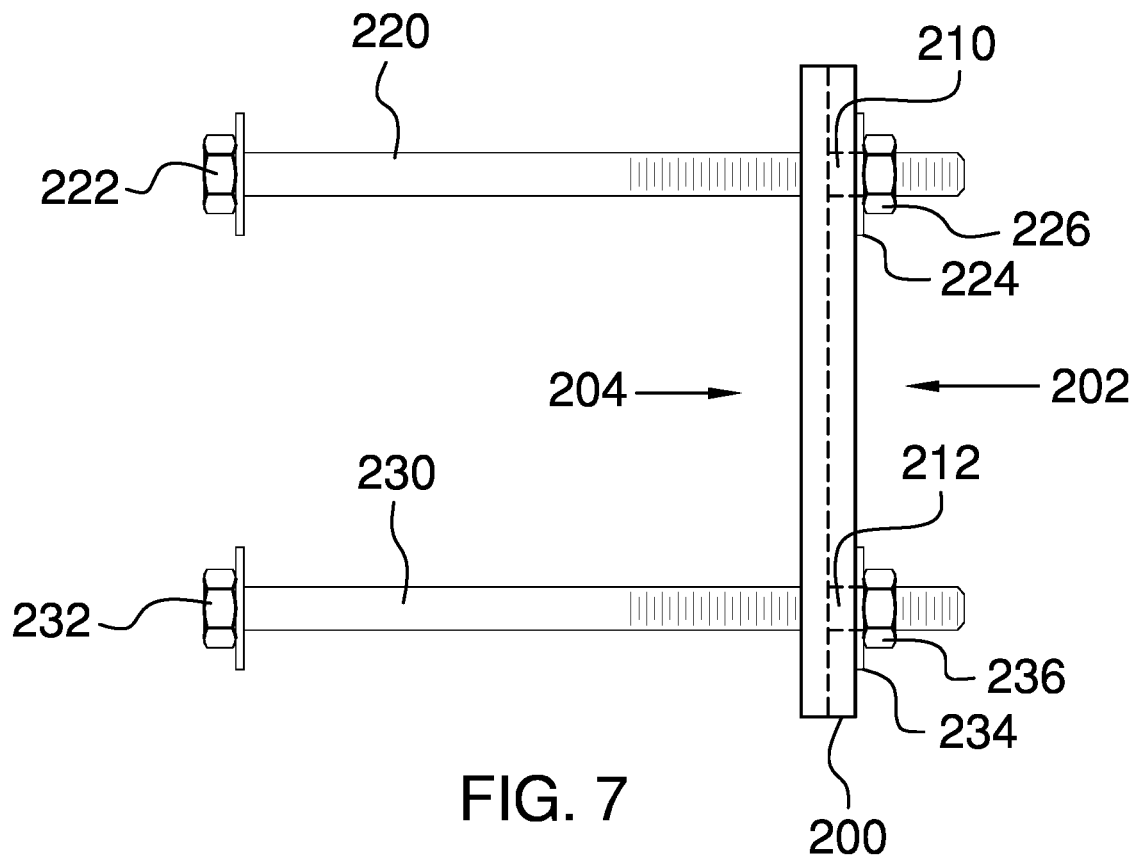
FIG. 7 is a side detail view of an embodiment of the disclosure illustrating the base plate.
Figure 8:
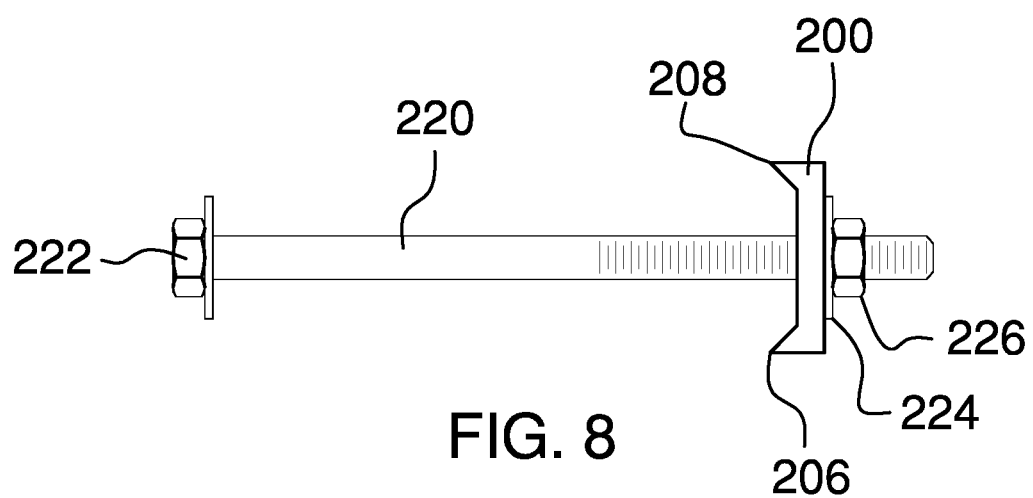
FIG. 8 is a top detail view of an embodiment of the disclosure illustrating the base plate.
Figure 9:
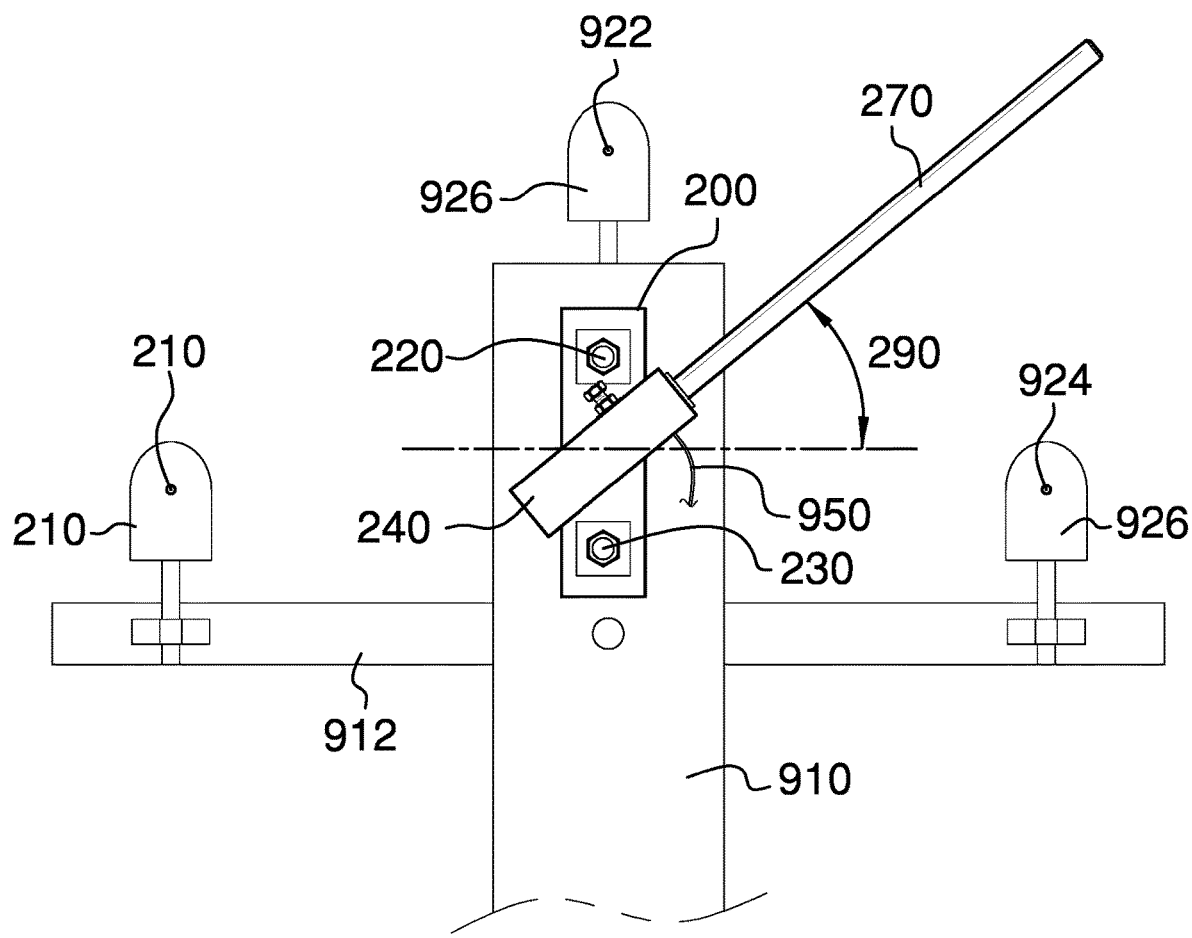
FIG. 9 is an in-use view of an embodiment of the disclosure illustrating use on a three-phase post.

Detailed reference will now be made to a first potential embodiment of the disclosure, which is illustrated in FIGS. 1 through 9.

The utility pole mounted lightning rod 100 (hereinafter invention) comprises a base plate 200, a housing tube 240, and a lightning rod 270. The invention 100 may be a lightning protection system that is adapted to be mounted at the top of a utility pole 900. The invention 100 may divert energy from a lightning strike to a grounding wire 950 and away from primary wires and other power utility equipment. The base plate 200 may be coupled to a side of the utility pole 900 at the top of the utility pole 900. The housing tube 240 may be coupled to the base plate 200 and may retain the lightning rod 270. Because the housing tube 240 may be coupled to the base plate 200 at an oblique angle 290, the invention 100 may be operable on three-phase posts where contact with one of the primary wires passing directly over the top of the utility pole 900 must be avoided.

The base plate 200 may be a vertically-oriented armature that may be coupled to the side of the utility pole 900 adjacent to the top of the utility pole 900. The base plate 200 may be a rectangular plate comprising a left wedge 206 and a right wedge 208. The base plate 200 may be defined by a pole side 204 which may press against the utility pole 900 and a rod side 202 which may be opposite the pole side 204. The rod side 202 may be flat and the housing tube 240 may be coupled to the rod side 202 of the base plate 200. The pole side 204 may be flat except for the left wedge 206 and the right wedge 208. The left wedge 206 and the right wedge 208 may be operable to stabilize the base plate 200 against the utility pole 900. The left wedge 206 may be a vertically-oriented tapering that projects from the pole side 204 of the base plate 200 on the left side of the base plate 200. The right wedge 208 may be a vertically-oriented tapering that projects from the pole side 204 of the base plate 200 on the right side of the base plate 200.

The base plate 200 may comprise an upper bolt aperture 210 and a lower bolt aperture 212. The upper bolt aperture 210 and the lower bolt aperture 212 may be apertures located along the vertical centerline of the base plate 200 and passing from the pole side 204 to the rod side 202. The upper bolt aperture 210 may be located within the upper half of the base plate 200, above the housing tube 240. The lower bolt aperture 212 may be located within the lower half of the base plate 200, below the housing tube 240.

The base plate 200 may be mounted to the utility pole 900 by passing an upper mounting bolt 220 through the upper bolt aperture 210 on the base plate 200 and through an upper lightning rod mounting aperture 930 located in the utility pole 900 and by passing a lower mounting bolt 230 through the lower bolt aperture 212 on the base plate 200 and through a lower lightning rod mounting aperture 932 located in the utility pole 900. On one side of the utility pole 900, an upper bolt head 222 and a lower bolt head 232 may press against the utility pole 900. On the opposite side of the utility pole 900, an upper nut 226 and an upper square washer 224 on the upper mounting bolt 220 and a lower nut 236 and a lower square washer 234 on the lower mounting bolt 230 may press against the base plate 200. In some installations, the orientation of the upper mounting bolt 220 and the orientation of the lower mounting bolt 230 may be reversed such that the upper nut 226 and the lower nut 236 are located on the side of the utility pole 900 opposite the base plate 200 and the upper bolt head 222 and the upper square washer 224 along with the lower bolt head 232 and the lower square washer 234 press against the base plate 200.

The housing tube 240 may be a holder for the lightning rod 270. The housing tube 240 may be coupled to the base plate 200 at the oblique angle 290 such that the lightning rod 270 does not interfere with any of the primary wires located directly above the utility pole 900. In a preferred embodiment, the housing tube 240 may be oriented at an angle of 45 degrees relative to horizontal.

The housing tube 240 may comprise a rod aperture 242 at the top of the housing tube 240. The rod aperture 242 may provide access to a central cavity 244 located within the housing tube 240.

A sleeve 246 may be operable to improve the electrical connection between the lightning rod 270 and the grounding wire 950. The sleeve 246 may be a brass lining for the central cavity 244. The sleeve 246 may slide into the central cavity 244 and the lightning rod 270 may slide into the sleeve 246. In some embodiments, the sleeve 246 may comprise an aperture for the grounding wire 950 to pass through the sleeve 246, an aperture for a retention bolt 250 to pass through the sleeve 246, or both.

The housing tube 240 may comprise a retention bolt aperture 248. The retention bolt aperture 248 may be located on a side of the housing tube 240. The retention bolt 250 may screw into the retention bolt aperture 248 to hold the lightning rod 270 in place. The retention bolt 250 may be loosened to remove the lightning rod 270 and may be tightened to prevent removal of the lightning rod 270.

A retention nut 254 may be located on the retention bolt 250 between the head of the retention bolt 250 and the housing tube 240. The retention nut 254 may be operable to prevent loosening of the retention bolt 250. The retention nut 254 may be turned to move the retention nut 254 against the housing tube 240 to prevent rotation of the retention bolt 250 and may be turned in the opposite rotational direction to move the retention nut 254 away from the housing tube 240 to permit rotation of the retention bolt 250.

The housing tube 240 may comprise a ground wire aperture 256. The ground wire aperture 256 may be located on a side of the housing tube 240. The grounding wire 950 may be inserted through the ground wire aperture 256 such that the grounding wire 950 may reach and make contact with the lightning rod 270. As a non-limiting example, the grounding wire 950 may be routed down the utility pole 900 from the lightning rod 270 to a grounding rod such that the energy from the lightning strike may be passed from the lightning rod 270 through the grounding wire 950 to the grounding rod and into the ground.

The housing tube 240 may comprise a seal 260 at the top to cover the rod aperture 242. The seal 260 may comprise a central cover aperture 262 for the lightning rod 270 to pass through. The seal 260 may be operable to seal the rod aperture 242 to reduce the amount of dust, dirt, and/or water that may enter the central cavity 244. In some embodiments, the seal 260 may comprise a slit 264 from the central cover aperture 262 to the bottom edge of the seal 260 such that the seal 260 is easier to install. In a preferred embodiment, the seal 260 may be made from natural or synthetic rubber.

The lightning rod 270 may be a round electrical conductor that is operable to conduct the energy from the lightning strike to the grounding wire 950. The length of the lightning rod 270 may be selected to place the distal tip of the lightning rod 270 higher than any of the primary wires that are supported by the utility pole 900. In a preferred embodiment, the lightning rod 270 made be a steel-coated copper rod having a diameter of 1.0 inches+/−0.125 inches.

In some embodiments, the base plate 200 and the housing tube 240 may be plastic parts that are molded as a single component.

In use, the base plate 200 may be mounted on the utility pole 900 by first drilling the upper lightning rod mounting aperture 930 and the lower lightning rod mounting aperture 932 through the utility pole 900—parallel to each other and spaced to match the separation of the upper bolt aperture 210 and the lower bolt aperture 212 in the base plate 200 and then coupling the base plate 200 to the utility pole 900 using the upper mounting bolt 220 and the lower mounting bolt 230. The housing tube 240 may be oriented at the oblique angle 290 to direct the lightning rod 270 upwards. The grounding wire 950 may be passed through the ground wire aperture 256 into the central cavity 244 and up through the rod aperture 242. The lightning rod 270 may be placed into the sleeve 246 and the grounding wire 950 may be bonded to the lightning rod 270. The lightning rod 270 and the sleeve 246 may be placed into the housing tube 240 through the rod aperture 242 such that the lightning rod 270 extends upward past the primary wires. The retention bolt 250 may be tightened against the lightning rod 270 to prevent removal of the lightning rod 270 and then the retention nut 254 may be tightened against the housing tube 240 to prevent rotation of the retention bolt 250.

As a non-limiting example, the utility pole 900 may be a center pole 910 of a three-phase post. The three-phase post may comprise primary wires attached to the center pole 910 and to a cross-arm 912. A first primary wire 920 may be coupled to the left side of the cross-arm 912, a second primary wire 922 may be coupled to the top of the center pole 910, and a third primary wire 924 may be coupled to the right side of the cross-arm 912. Each of the primary wires may be separated from the three-phase post by an insulator 926. The invention 100 may orient the lightning rod 270 at the oblique angle 290 such that the lightning rod 270 reaches a height that is higher than the second primary wire 922 and avoids contact with the second primary wire 922.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, a "cavity" may be an empty space or negative space that is formed within an object.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, a "housing" may be a rigid or semi-rigid casing that encloses and protects one or more devices.

As used herein, "oblique angle" may refer to any angle that is not a right angle or a multiple of a right angle.

As used in this disclosure, "orientation" may refer to the positioning and/or angular alignment of a first object relative to a second object or relative to a reference position or reference direction.

As used in this disclosure, a "plate" may be a flat, rigid object having at least one dimension that is of uniform thickness and is thinner than the other dimensions of the object. Plates often have a rectangular or disk like appearance. Plates may be made of any material, but are commonly made of metal.

As used herein, "rectangle" and "rectangular" may refer to a closed figure comprising four straight lines joined by four right angles. The opposing sides of a rectangle have equal length. A square is considered to be a special type of rectangle where all four sides are the same length. An object may still be considered to have a generally rectangular shape even if corners of the object are rounded off as long as two sets of opposing, straight-line, perpendicular sides are apparent.

As used in this disclosure, a "sleeve" may be a tube like covering that is placed over or around a rod, shaft, cable, or other cylindrical object.

As used in this disclosure, a "slit" may be a long narrow cut or opening that is formed in or through an object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A utility pole mounted lightning rod comprising:
   a base plate, a housing tube, and a lightning rod;
   wherein the utility pole mounted lightning rod is a lightning protection system that is adapted to be mounted at the top of a utility pole;
   wherein the utility pole mounted lightning rod diverts energy from a lightning strike to a grounding wire and away from primary wires and other power utility equipment;
   wherein the base plate is coupled to a side of the utility pole at the top of the utility pole;
   wherein the housing tube is coupled to the base plate and retains the lightning rod;

wherein because the housing tube is coupled to the base plate at an oblique angle, the utility pole mounted lightning rod is operable on three-phase posts where contact with one of the primary wires passing directly over the top of the utility pole must be avoided.

2. The utility pole mounted lightning rod according to claim 1
wherein the base plate is a vertically-oriented armature that is coupled to the side of the utility pole adjacent to the top of the utility pole;
wherein the base plate is a rectangular plate comprising a left wedge and a right wedge;
wherein the base plate is defined by a pole side which presses against the utility pole and a rod side which is opposite the pole side;
wherein the rod side is flat and the housing tube is coupled to the rod side of the base plate;
wherein the pole side is flat except for the left wedge and the right wedge;
wherein the left wedge and the right wedge are operable to stabilize the base plate against the utility pole;
wherein the left wedge is a vertically-oriented tapering that projects from the pole side of the base plate on the left side of the base plate;
wherein the right wedge is a vertically-oriented tapering that projects from the pole side of the base plate on the right side of the base plate.

3. The utility pole mounted lightning rod according to claim 2
wherein the base plate comprises an upper bolt aperture and a lower bolt aperture;
wherein the upper bolt aperture and the lower bolt aperture are apertures located along the vertical centerline of the base plate and passing from the pole side to the rod side;
wherein the upper bolt aperture is located within the upper half of the base plate, above the housing tube;
wherein the lower bolt aperture is located within the lower half of the base plate, below the housing tube.

4. The utility pole mounted lightning rod according to claim 3
wherein the base plate is mounted to the utility pole by passing an upper mounting bolt through the upper bolt aperture on the base plate and through an upper lightning rod mounting aperture located in the utility pole and by passing a lower mounting bolt through the lower bolt aperture on the base plate and through a lower lightning rod mounting aperture located in the utility pole;
wherein on one side of the utility pole, an upper bolt head and a lower bolt head press against the utility pole;
wherein on the opposite side of the utility pole, an upper nut and an upper square washer on the upper mounting bolt and a lower nut and a lower square washer on the lower mounting bolt press against the base plate.

5. The utility pole mounted lightning rod according to claim 4
wherein the housing tube is a holder for the lightning rod;
wherein the housing tube is coupled to the base plate at the oblique angle such that the lightning rod does not interfere with any of the primary wires located directly above the utility pole.

6. The utility pole mounted lightning rod according to claim 5
wherein the housing tube is oriented at an angle relative to horizontal.

7. The utility pole mounted lightning rod according to claim 5
wherein the housing tube comprises a rod aperture at the top of the housing tube;
wherein the rod aperture provide accesses to a central cavity located within the housing tube.

8. The utility pole mounted lightning rod according to claim 7
wherein a sleeve is operable to improve the electrical connection between the lightning rod and the grounding wire;
wherein the sleeve is a brass lining for the central cavity;
wherein the sleeve slides into the central cavity and the lightning rod slides into the sleeve.

9. The utility pole mounted lightning rod according to claim 8
wherein the sleeve comprises an aperture for the grounding wire to pass through the sleeve, an aperture for a retention bolt to pass through the sleeve, or both.

10. The utility pole mounted lightning rod according to claim 9
wherein the housing tube comprises a retention bolt aperture;
wherein the retention bolt aperture is located on a side of the housing tube;
wherein the retention bolt screws into the retention bolt aperture to hold the lightning rod in place;
wherein the retention bolt is loosened to remove the lightning rod and is tightened to prevent removal of the lightning rod.

11. The utility pole mounted lightning rod according to claim 10
wherein a retention nut is located on the retention bolt between the head of the retention bolt and the housing tube;
wherein the retention nut is operable to prevent loosening of the retention bolt;
wherein the retention nut is turned to move the retention nut against the housing tube to prevent rotation of the retention bolt and is turned in the opposite rotational direction to move the retention nut away from the housing tube to permit rotation of the retention bolt.

12. The utility pole mounted lightning rod according to claim 11
wherein the housing tube comprises a ground wire aperture;
wherein the ground wire aperture is located on a side of the housing tube;
wherein the grounding wire is inserted through the ground wire aperture such that the grounding wire reaches and makes contact with the lightning rod.

13. The utility pole mounted lightning rod according to claim 12
wherein the grounding wire is routed down the utility pole from the lightning rod to a grounding rod such that the energy from the lightning strike is passed from the lightning rod through the grounding wire to the grounding rod and into the ground.

14. The utility pole mounted lightning rod according to claim 13
wherein the housing tube comprises a seal at the top to cover the rod aperture;
wherein the seal comprises a central cover aperture for the lightning rod to pass through;
wherein the seal is operable to seal the rod aperture to reduce the amount of dust, dirt, and/or water that enters the central cavity.

15. The utility pole mounted lightning rod according to claim 14
wherein the seal comprises a slit from the central cover aperture to the bottom edge of the seal such that the seal is easier to install.

16. The utility pole mounted lightning rod according to claim 15
wherein the seal is made from natural or synthetic rubber.

17. The utility pole mounted lightning rod according to claim 15
wherein the lightning rod is a round electrical conductor that is operable to conduct the energy from the lightning strike to the grounding wire;
wherein the length of the lightning rod is selected to place the distal tip of the lightning rod higher than any of the primary wires that are supported by the utility pole.

18. The utility pole mounted lightning rod according to claim 17
wherein the lightning rod made be a steel-coated copper rod having a diameter of 1.0 inches+/−0.125 inches.

19. The utility pole mounted lightning rod according to claim 17
wherein the base plate and the housing tube are plastic parts that are molded as a single component.

\* \* \* \* \*